United States Patent Office 2,742,510
Patented Apr. 17, 1956

2,742,510

PROCESS FOR DEHALOGENATION OF ORGANIC COMPOUNDS

Horace R. Davis, Cedar Grove, N. J., assignor to The M. W. Kellogg Company, Jersey City, N. J., a corporation of Delaware No Drawing. Application June 17, 1955,
Serial No. 516,328

20 Claims. (Cl. 260—653)

This invention relates to a novel and improved process for the dehalogenation of a fluorine-containing organic compound. In one of its aspects, this invention relates to a novel process for selectively dehalogenating a fluorohalocarbon. In another of its aspects, this invention relates to a novel process for preparing a fluorine-containing olefin. In still another aspect, this invention relates to the preparation of new and useful fluorine-containing olefins. In a more particular aspect, this invention relates to the preparation of a perfluorochloroolefin by a novel process comprising selective dechlorination of a perfluorochloroalkane.

Intermediate compounds of significant industrial importance are prepared by dehalogenation reactions. For example, polymers of trifluorochloroethylene are prepared by polymerizing monomeric trifluorochloroethylene which is usually obtained by the dechlorination of trifluorotrichloroethane (Freon 113).

Several techniques for dehalogenation of fluorine-containing organic compounds have been proposed. One technique uses methyl alcohol and a metal dehalogenating agent, for example, zinc. This technique results in relatively high yields of the desired product with a minimum formation of undesirable side products. However, recovery of alcohol is so costly that the alcohol is usually discarded. Aqueous dehalogenation techniques are also known. In these techniques, a metal dehalogenating agent is also employed. The aqueous technique, however, may lead to the production of high yields of undesirable side products thereby making the process commercially unattractive. Another dehalogenation technique involves pyrolysis accompanied with its numerous and obvious disadvantages but which technique is often necessitated by the inability to obtain relatively good selectivity of the desired product by other processes.

It is an object of the present invention to provide a novel and improved dehalogenation process for the dehalogenation of fluorine-containing organic compounds, which process has good selectivity, is easily controlled and is accompanied by the formation of a minimum amount of by-products.

Another object is to provide a novel and improved dehalogenation process for the production of fluorine-containing olefins in good yield, which process utilizes a minimum number of reactants and which can be carried out in the absence of a solvent or diluent.

Another object is to provide a novel process for dehalogenating perfluorohalocarbons to produce perfluorohaloolefins in good yield and selectivity.

Another object is to provide a novel process for selectively dechlorinating a perfluorochloroalkane having at least one chlorine atom on each of two adjacent carbon atoms to yield the corresponding dechlorinated fluorine-containing olefin.

Another object is to provide a novel and economical process for the preparation of fluorine-containing olefins in good yield.

A further object is to provide a novel and improved process for the preparation of perfluorochloroolefins such as trifluorochloroethylene and 4,4-dichlorohexafluorobutene-1.

A further object is to provide new and useful fluorine-containing organic compounds.

Various other objects and advantages of the present invention will become apparent to those skilled in the art from the accompanying description and disclosure.

Accordingly, the above objects are accomplished by a novel dehalogenation process comprising reaction between the starting material, that is a fluorine-containing organic compound, with a trialkyl phosphite to produce a fluorine-containing olefin. The fluorine-containing organic compound which is dehalogenated by the process of the present invention contains at least one halogen atom which is a halogen atom other than fluorine, that is, a halogen selected from the group consisting of chlorine, bromine and iodine atoms, on each of two adjacent carbon atoms and contains between about 2 and about 40 carbon atoms per molecule, and preferably contains between about 4 and about 20 carbon atoms per molecule. The trialkyl phosphite reactant used as the dehalogenating agent includes those having between about 3 and about 20 carbon atoms per molecule. The preferred dehalogenating agents are the trialkyl phosphites having at least 6 carbon atoms per molecule. The process of the present invention is carried out at a temperature between about 0° C. and about 225° C. and at atmospheric, subatmospheric or superatmospheric pressures, the pressure employed depending to a large extent upon the particular starting material which is to be dehalogenated.

The novel process of the present invention leads to the production of fluorine-containing olefins in good yield and selectivity with the minimum formation of undesirable by-products, which fluorine-containing olefins are valuable chemical intermediates useful, for example, as monomers in polymerization reactions and as intermediates in the production of refrigerants and fluorine-containing alkanoic acids. This invention is particularly suited to the preparation of perfluorohaloolefins which ordinarily are difficult compounds to prepare in high yield by conventional procedures.

As indicated previously, the starting materials which are dehalogenated by the process of the present invention are fluorine-containing organic compounds having between about 2 and about 40 carbon atoms per molecule and having at least 1 halogen selected from the group consisting of chlorine, bromine and iodine atoms on each of two adjacent carbon atoms. The adjacent carbon atoms can be additionally bonded to alkyl, aryl, halogen, nitro or hydrogen substituents, which substituents may also be bonded to the other carbon atoms of the starting material. Such fluorine-containing organic compounds or fluorohalocarbons include saturated and unsaturated polyhalogenated and perhalogenated alicyclic and acyclic aliphatic compounds preferably containing between about 4 and about 20 carbon atoms per molecule. The unsaturated fluorohalocarbons which may be employed are those in which the unsaturation is between adjacent carbon atoms which are other than the adjacent carbon atoms to which the removable halogens are bonded.

Typical examples of one class of starting materials which are dehalogenated by the process of the present invention yielding useful chemical intermediates are the telomer products derived by telomerization of trifluorochloroethylene in the presence of a sulfuryl halide as the telogen. The preferred telomer products which are dehalogenated by the presently described process are those obtained by telomerization of trifluorochloroethylene in the presence of sulfuryl chloride, sulfuryl bromide or bromosulfuryl chloride and have the general formula:

$$Y_1(CR_2CFCl)_nY_2$$

wherein $Y_1$ and $Y_2$ are halogens selected from the group consisting of chlorine and bromine, and $n$ is an integer from 2 to about 16. In each of these telomer products, one of the following groups is present at one end of the chain: $ClCF_2$—$CFCl$— or $BrCF_2$—$CFCl$—. When such telomer products are dehalogenated in the presence of a trialkyl phosphite in accordance with the present invention, the two chlorine atoms or the chlorine and bromine atoms on the adjacent terminal carbon atoms are removed yielding perfluorochloroolefins. Such olefins are useful, for example, in the preparation of perfluorochloroalkanoic acids by suitable oxidation procedures. For example, the perfluorochloroolefins may be oxidized in aqueous potassium permanganate at a temperature between about —30° C. and about 80° C. yielding perfluorochloroalkanoic acids.

Such telomer products are prepared by reacting trifluorochloroethylene and the sulfuryl halide telogen in the presence of a promoter at a temperature between about 75° C. and about 210° C. in the presence or absence of sulfur dioxide. The telomerization is preferably carried out in the presence of the promoter, benzoyl peroxide, which is dissolved in a solvent such as carbon tetrachloride while the trifluorochloroethylene monomer is added under pressure in a closed system.

In a specific example illustrating the preparation of the fluorohalocarbon telomer products which are preferably dehalogenated as described herein, 9.93 grams of benzoyl peroxide and 24 grams of sulfur dioxide are dissolved in 115 ml. of carbon tetrachloride and 325 ml. of sulfuryl chloride. To this mixture, 440 ml. of trifluorochloroethylene monomer are added and the system is heated to about 95° C. for a period of 4 hours at a pressure of 350 pounds per square inch gage with agitation to produce a high yield of relatively low molecular weight polymer. The telomeric product is relatively easy to separate into its individual compounds by distillation since it contains only compounds having an even number of carbon atoms so that each compound has a boiling point relatively far removed from that of the next lower or next higher compound. The formula of these telomer products of trifluorochloroethylene and sulfuryl chloride is the following:

$$Cl(CF_2CFCl)_nCl$$

wherein $n$ is an integer between about 2 and about 16.

The physical characteristics of some of the individual telomer products and of the mixtures of such products which are suitable starting materials in the process of the present invention are given in the following Table I and Table II, respectively.

TABLE I

*Physical properties of individual trifluorochloroethylene sulfuryl chloride telomer products*

| Individual Telomer Products | Boiling Point, ° C. | Index of Refraction ($n_D^{25}$) |
| --- | --- | --- |
| (1) Cl—(CF$_2$—CFCl)$_2$—Cl | 134 | 1.3820 |
| (2) Cl—(CF$_2$—CFCl)$_3$—Cl | 203 | 1.3956 |
| (3) Cl—(CF$_2$—CFCl)$_4$—Cl | 255 | 1.4018 |
| (4) Cl—(CF$_2$—CFCl)$_5$—Cl | 300 | 1.4024 |
| (5) Cl—(CF$_2$—CFCl)$_6$—Cl | 335 | 1.4110 |

TABLE II

*Physical properties of mixtures of trifluorochloroethylene-sulfuryl chloride telomer products*

| Telomer Oil Fraction | Boiling Range, ° C. at 0.5 mm. | Approximate Molecular Weight | Density 100° F. | Density 210° F. | Viscosity, cs. 68° F. | Viscosity, cs. 130° F. | Melting Point, ° F. |
| --- | --- | --- | --- | --- | --- | --- | --- |
| 1 | −20–95 | 460 | 1.823 | 1.720 | 4.0 | | |
| 2 | 95–132 | 570 | 1.862 | 1.768 | 12.3 | 3.7 | |
| 3 | 132–170 | 680 | 1.910 | 1.823 | 108 | 14.4 | |
| 4 | 170–207 | 800 | 1.940 | 1.853 | ᵃ 2.07 | ᵇ 8.9 | |
| 5 | 207–245 | 1,000 | 1.962 | 1.873 | ᵃ 1,578 | ᵇ 27.2 | 88 |
| 6 | 245– | 1,600 | | | | ᵇ 371.6 | 175 |

ᵃ at 100° F.
ᵇ at 210° F.

Other suitable fluorine-containing polyhalogenated and perhalogenated aliphatic compounds which may be dehalogenated as described herein are the known fluorohalo ethanes, propanes, butanes, hexanes, cyclobutanes and cyclohexanes. Typical examples of these suitable fluorohalocarbons are: 1,1,2-tribromo-1-fluoroethane; 1,2,2-tribromo-1,1-difluoroethane; 1,1,2-trichloro-1,2-difluoroethane; 1,1,2-trichloro-2,2-difluoroethane; 1,2-dichlorotetrafluoroethane; 1,1,2-trifluorotrichloroethane; 1,2-dichloro-1,1-difluoroethane; phenyl tetrachloromonofluoroethane; phenyl trichlorodifluoroethane; pentachlorophenyl trichlorodifluoroethane; 1,2-dichloro-1,2-difluoro-1,2-dinitroethane; 1,1,2,3-tetrachloro-2,3-trifluoropropane; 1,1,3-trichloro-3,3-difluoropropane; 1,1,2-trichloro-2,3,3,-3-tetrafluoropropane; 1,2-dichloro-1,1-difluoropropane; 1,2-dibromo-2-chloropentafluoropropane; 1,2-dichloro-1,1-difluorobutane; 2,3-dichloro-2-fluorobutane; 1,2,3,4-tetrabromohexafluorobutane; 1,1,2,3,4,4-hexachloro-1,2,-3,4-tetrafluorobutane; 1,1,2-trichloropentafluorocyclobutane; 2,3-dichlorohexafluorocyclobutane; and 1,2-dichlorohexafluorocyclobutane; 2,3,3,4,4,5-hexachlorooctafluorohexane; 1,2-dichlorodecafluorocyclohexane; 3,3,4-trichloropentafluoro-1-butene; 3,4-dichlorohexafluora-1-butene and 2,3-dichloro-2,3-bis(trifluoromethyl)hexafluorobutane.

As indicated previously, the dehalogenating agents of the present invention are the trialkyl phosphites containing between about 3 and about 20 carbon atoms per molecule, and are preferably those having between about 6 and about 12 carbon atoms per molecule. Each alkyl group preferably contains between about 2 and about 4 carbon atoms. The alkyl groups of the trialkyl phosphite may be the same or different without departing from the scope of the present invention.

Typical examples of suitable dehalogenating agents are trimethyl phosphite, triethyl phosphite, tripropyl phosphite, triisopropyl phosphite, tributyl phosphite, trihexyl phosphite and the like. These compounds are prepared by techniques well known to those skilled in the art. For example, triethyl phosphite is prepared by reacting phosphorus trichloride and ethanol in ether in the presence of pyridine.

The mol ratio of dehalogenating agent to starting material may vary over a relatively wide range such as between about 10:1 and about 1:10. The preferred mol ratio is between about 3:1 and about 1:5 of the trialkyl phosphite to fluorohalocarbon. It is particularly preferred to employ an excess of the fluorohalocarbon in order to keep competing reactions at a minimum. The dropwise addition of the trialkyl phosphite to excess starting material leads to the best results, that is to a high yield of fluorine-containing olefin product accompanied by the minimum formation of by-products.

As indicated previously, the dehalogenation process of the present invention is effected at a temperature between about 0° C. and about 225° C. The temperature range within which the highest yield of product is obtained is a temperature between about 25° C. and about 175° C. The process may be carried out at atmospheric pressure, at subatmospheric pressure, under autogenous conditions of pressure, or at superimposed pressure. Pressures ranging between about 50 and about 500 pounds per square inch gage are preferably employed when the more volatile fluorine-containing organic compounds are used as the starting material in order to maintain sufficient contact between the vapor of the starting material and the dehalogenating agent during the reaction. For example, when 1,1,2-trichlorotrifluoroethane is dehalogenated with triethyl phosphite in accordance with the present invention, it is desirable to employ a pressure of between about 85 and about 200 pounds per square inch gage in order to obtain a sufficiently high concentration of the halogenated ethane in intimate contact with the trialkyl phosphite.

The reaction time may vary over relatively wide limits such as between about 2 minutes and about 24 hours. A convenient way of determining when the reaction is almost complete is to observe when the evolution of gaseous product ceases. When using triethyl phosphite to dechlorinate a fluorochloralkane, for example, gaseous ethyl chloride is evolved as one product of the reaction. The ethyl chloride is preferably allowed to pass from the reaction zone into a cold trap where it is liquified. The reaction is preferably allowed to proceed for about 15 minutes after no further evolution of the ethyl chloride is observed in order to insure completion of the reaction. Generally speaking, the reaction runs to completion within a contact time of between about 1 hour and about 5 hours.

The process of the present invention may be carried out in the presence or absence of a solvent or diluent and is preferably carried out in the absence of a solvent whenever suitable. Solvents are generally employed when the starting material is a higher molecular weight fluorine-containing halogenated organic compound which is a normally solid or waxy material as in the case of the higher molecular weight telomer products above-mentioned. Suitable solvents and diluents which may be used include aliphatic hydrocarbons such as petroleum ether, hexane and cyclohexane; aromatics such as benzene, toluene and xylene; organic ethers such as ethyl ether, butyl ether, dioxane and tetrahydrofuran; alcohols such as ethanol, butanol and hexanol; ketones such as acetone, methyl ethyl ketone, and methyl isobutyl ketone and, in general, any organic liquid which does not react under the conditions of the process described herein. When employed, the solvent or diluent is present usually in an amount between about 25 and about 75 volume per cent of the total mixture.

The process of the present invention has been found to be particularly valuable in dechlorinating perfluorochloroalkanes having a $CF_2Cl-$ end group bonded to a carbon bearing a second chlorine atom, and a $CFCl_2-$ end group bonded to a $-CF_2-$ group. As will become apparent from the following examples, attempts to dechlorinate such a compound by conventional techniques such as dechlorination in water or alcohol in the presence of a metal dehalogenating agent such as zinc have led to the reduction of the $-CFCl_2$ group to $-CFClH$ rather than to the desired perfluorochloroolefin.

The products obtained by the process of the present invention are purified by conventional methods such as fractional distillation of liquids and crystallization of solid products. The indentification of the products is achieved by conventional methods such as chemical analysis for per cent composition, mass spectrometer analysis, determination of physical constants and infrared absorption analysis.

It is postulated without limiting the scope of the present invention that the dehalogenating reaction described herein proceeds according to the following scheme which illustrates the dehalogenation of the dimer obtained by telomerizing trifluorochloroethylene and sulfuryl chloride, namely, 1,2,4,4-tetrachlorohexafluorobutane in the presence of triethyl phosphite.

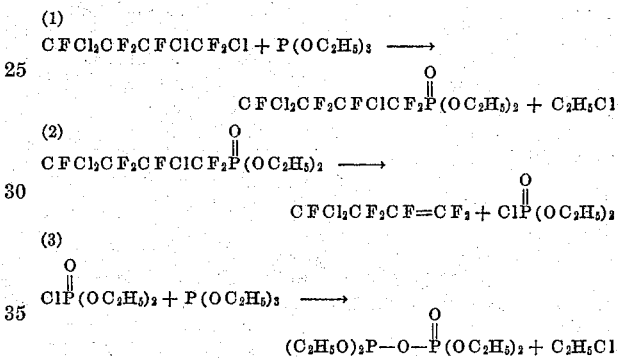

It is possible that under appropriate reaction conditions the hypothetical perhalogenated alkyl phosphonate intermediate shown in equation (1) above may be isolated as the product of the process.

The above scheme postulated as the mechanism of the reaction of the presently described process is merely theoretical and should not be construed as unnecessarily limiting thereto. Other theories or reasons may equally well explain the true course of the reaction.

It is to be understood that the procedures employed for the isolation of the desired products will vary in accordance with the physical nature of the products and that the temperature and pressure of reaction, contact time and molar quantities of the reactants to be preferred in any instance will depend upon the raw materials employed and the product desired.

The following examples are offered as a better understanding of the present invention, but the examples are not to be construed as unnecessarily limiting the present invention.

*Example 1*

This example illustrates the debromination of a perfluorohaloethane with triethyl phosphite as the debrominating reagent.

To a three-necked round bottom flask equipped with a dropping funnel, stirrer and an air-cooled condenser which, in turn, was connected to a bubbler and cold trap maintained at a temperature of $-80°$ C., there were added 200 grams (0.73 mol) of 1,2-dibromo-1,1,2-trifluorochloroethane. There were then added 30 grams (0.18 mol) triethyl phosphite from a dropping funnel. The addition of the triethyl phosphite was such that the exothermic reaction maintained a reaction temperature between about 85° C. and about 90° C. without the benefit of external heating. After five minutes, the addition was complete and the generation of gas had ceased after a total reaction time of 20 minutes. The cold trap was then disconnected from the system and its contents (20.8 grams) were submitted to mass spectrometer analysis. This analysis showed the contents of the trap to be exclusively ethyl bromide (5.2 grams) and trifluorochloroethylene (15.6 grams). The yield of trifluorochloroethylene product obtained was 74.5 per cent based on the amount of triethyl phosphite which was charged.

*Example 2*

This example illustrates the selective dechlorination of a perfluorochlorobutane using triethyl phosphite as the dechlorinating agent.

The perfluorochlorobutane employed in this example was the telomer dimer product referred to as product (1) of Table I above, obtained by telomerizing trifluorochloroethylene in the presence of sulfuryl chloride using benzoyl peroxide as the promoter at a temperature of 95° C. for a period of 4 hours.

To a 500 ml. round bottom flask equipped with a magnetic stirrer, a dropping funnel and a Friedrich condenser which, in turn, was attached to a bubbler and cold trap maintained at a temperature of −68° C., there was charged 357 grams (1.17 mol) of 1,2,4,4-tetrachlorohexafluorobutane having a boiling point of 134° C. and an index of refraction ($n_D^{20}$) of 1.3820. The contents of the flask were then heated to 130° C. after which 105.5 grams (0.63 mol) of triethyl phosphite were added dropwise over a period of 3 hours. The heating was continued for an additional period of 1 hour after which time the generation of gas had ceased. The cold trap was found to contain only liquefied ethyl chloride (25.6 grams).

The Friedrich condenser fitted to the reaction flask was replaced with a Vigreaux distillation column and the reaction product was distilled. A fraction (52.8 grams) boiling between about 60° C. and about 80° C. was collected. This fraction was further purified by redistillation to yield a fraction having a boiling point of 67°–68° C., an index of refraction ($n_D^{20}$) of 1.3424 and a density ($D_4^{20}$) of 1.6192. The molar refractivity of this product was found to be 30.25. The calculated molar refractivity for $C_4F_6Cl_2$ is 30.22. Infrared analysis of the product showed an absorption band at 5.57 microns indicative of the $CF_2=CF-$ group. The product thus obtained was identified as 4,4-dichlorohexafluorobutene-1.

Attempts to obtain 4,4-dichlorohexafluorobutene-1 by dehalogenation of the telomer dimer in a variety of solvents using zinc as the dehalogenating agent were found to be essentially unsuccessful. In dioxane there was essentially no reaction. In ethanol or water there was a low yield of product having the formula, $CF_2=CFCF_2CFClH$. In pyridine this reaction with zinc yielded 8 grams of this same hydrogen-containing butene from a 152 gram charge. The same reaction occurred in water. When the dehalogenation was carried out in methanol, the reaction yielded the methanol addition product of the hydrogen-containing butene rather than the desired 4,4-dichlorohexafluorobutene-1.

*Example 3*

This example illustrates the selective dechlorination of a perfluorochlorooctane using triethyl phosphite as the dechlorinating agent.

The perfluorochlorooctane employed in this example was the telomer tetramer product, referred to as product (3) of Table I above, obtained by telomerizing trifluorochloroethylene in the presence of sulfuryl chloride and benzoyl peroxide at a temperature of 95° C. for a period of 4 hours.

To a 150 ml. round bottom flask fitted with a stirrer and an air cooled condenser which, in turn, was connected to a bubbler and cold trap maintained at a temperature of −80° C., there were charged 100.3 grams of 1,2,4,6,8,8-hexachlorododecafluorooctane having a boiling point of 255° C. and an index of refraction ($n_D^{20}$) of 1.4018, and 17.4 grams of triethyl phosphite. The reaction mixture was heated to 130° C. and maintained at this temperature for a period of 1 hour after which time no further evolution of gas was observed. Ethyl chloride (5 grams) was the only product identified in the contents of the cold trap. The reaction mixture in the reaction flask was purified by fractional distillation to obtain an olefinic product having a boiling point of 60°–62° C. at 10 mm. mercury pressure and an index of refraction ($n_D^{20}$) of 1.3788. The product is identified as the tetrachloroperfluorooctane having the formula, $CF_2=CF-(CF_2CFCl)_3-Cl$.

*Example 4*

This example illustrates the selective dechlorination of a perfluorochlorodecane using triethyl phosphite as the dechlorinating agent.

The perfluorochlorodecane employed in this example was the telomer pentamer product, referred to as product (4) of Table I above, obtained by telomerizing trifluorochloroethylene in the presence of sulfuryl chloride and benzoyl peroxide at a temperature of 95° C. for a period of 4 hours.

To a one liter flask fitted with a magnetic stirrer and an air-cooled condenser which, in turn, was attached to a bubbler and a cold trap maintained at a temperature of −68° C. there were added 653 grams (1 mol) of telomer pentamer having a boiling point of 300° C. and an index of refraction ($n_D^{20}$) of 1.4024, and 332 grams (2 mols) of triethyl phosphite. The mixture was heated to 75° C. at which temperature a vigorous evolution of gas was observed. After about 1 hour of heating at this temperature the reaction rate decreased, heat was applied to bring the temperature of reaction up to 150° C. and this temperature was maintained for an additional period of 2 hours. The gaseous product which liquified in the cold trap was found to contain 97 grams of ethyl chloride and 3.0 grams of ethyl fluoride.

The reaction mixture remaining in the flask was extracted seven times with 100 milliliter portions of 5 per cent aqueous potassium hydroxide accompanied by slight warming of the solution mixture with each extraction. A total of 301 grams of material was removed in the aqueous extract. The remaining non-soluble oil (578 grams) was washed with water, then dried and fractionally distilled through a Vigreaux column. Various liquid fractions were obtained and only those which gave a positive potassium permanganate test were combined and redistilled through a spinning band distillation column. A total of 113 grams of olefinic material was obtained. Further purification of this material by redistillation gave a fraction having a boiling point of 55°–57° C. at 1.5 mm. mercury pressure and a refractive index ($n_D^{20}$) of 1.4012 to 1.4052. Infrared analysis of this product showed an absorption band at 5.57 microns indicative of a $CF_2=CF-$ group, which absorption band was not present in the infrared spectrum of the starting material. The product is identified as the pentachloroperfluorodecene having the formula, $CF_2=CF-(CF_2CFCl)_4-Cl$.

*Example 5*

This example illustrates the dechlorination of 1,1,2-trichlorotrifluoroethane in the presence of triethyl phosphite.

To a 250 ml. reaction vessel there are charged 186 grams (1.0 mol) of 1,1,2-trifluorotrichloroethane. The contents of the vessel are then heated to a temperature of 120° C. followed by the addition of 33 grams (0.2 mol) of triethyl phosphite at such a rate to maintain the pressure within the vessel at 150 pounds per square inch gage. The addition of the phosphite is completed within a period of about two hours. The reaction is allowed to proceed for another hour to yield trifluorochloroethylene in good yield.

As is apparent, the present invention relates to a novel and improved process for the selective dehalogenation of fluorohalocarbons by the use of a trialkyl phosphite as the dehalogenation agent. The improved process selectively dechlorinates, debrominates, or dechlorobrominates fluorohalocarbons with the minimum formation of reduction products and other undesirable by-products. The process is a particularly improved process for the preparation of difficultly prepared perfluorochloroolefins, some of which are known compounds and others of which represent new compositions of matter. Various alterations and modifications of the specific amounts of ingredients and reaction conditions may become apparent to those skilled in the art without departing from the scope of this invention.

I claim:

1. A process for dehalogenating a fluorine-containing organic compound which comprises reacting a trialkyl phosphite with a fluorine-containing organic compound under conditions such that the fluorine-containing organic compound is dehalogenated.

2. The process of claim 1 in which said trialkyl phosphite is trimethyl phosphite.

3. The process of claim 1 in which said trialkyl phosphite is triethyl phosphite.

4. The process of claim 1 in which said trialkyl phosphite is tripropyl phosphite.

5. The process of claim 1 in which said trialkyl phosphite is triisopropyl phosphite.

6. The process of claim 1 in which said trialkyl phosphite is tributyl phosphite.

7. A process for dehalogenating a fluorine-containing organic compound which comprises reacting a trialkyl phosphite and a fluorine-containing organic compound having a halogen other than fluorine on each of two adjacent carbon atoms to produce a fluorine-containing olefin.

8. A process for dehalogenating a fluorine-containing organic compound which comprises reacting a trialkyl phosphite and a fluorine-containing organic compound having a halogen other than fluorine on each of two adjacent carbon atoms in a weight ratio of said trialkyl phosphite to said fluorine-containing organic compound of between about 10:1 and about 1:10, at a temperature between about 0° C. and about 225° C. to produce a fluorine-containing olefin.

9. A process for dehalogenating a fluorine-containing organic compound which comprises reacting a trialkyl phosphite and a fluorine-containing organic compound having a halogen other than fluorine on each of two adjacent carbon atoms in a weight ratio of said trialkyl phosphite to said fluorine-containing organic compound of between about 3:1 and about 1:5 at a temperature between about 25° C. and about 175° C. to produce a fluorine-containing olefin.

10. A process for producing a fluorine-containing olefin which comprises reacting a trialkyl phosphite and a fluorohaloalkane having between about 2 and about 40 carbon atoms per molecule and having a halogen other than fluorine on each of two adjacent carbon atoms to produce a fluorine-containing olefin as a product of the process.

11. A process for the production of a perfluorochloroolefin which comprises reacting a trialkyl phosphite with a telomer product obtained by telomerizing trifluorochloroethylene in the presence of a sulfuryl halide to produce a perfluoroolefin.

12. A process for producing a perfluorochloroolefin which comprises reacting a trialkyl phosphite and a perfluorochloroalkane having between about 2 and about 40 carbon atoms per molecule and having at least one chlorine atom on each of 2 adjacent carbon atoms at a temperature between about 0° C. and about 225° C. to produce a perfluorochloroolefin, and recovering said perfluorochloroolefin as the product of the process.

13. A novel process for producing a perfluorochlorobutene which comprises reacting a trialkyl phosphite with a perfluorochlorobutane having at least one chlorine atom on each of two adjacent carbon atoms at a temperature between about 0° C. and about 225° C. to produce a perfluorochlorobutene, and recovering said perfluorochlorobutene as the product of the process.

14. A novel process for producing 4,4-dichlorohexafluorobutene-1 which comprises reacting a trialkyl phosphite with 1,2,4,4-tetrachlorohexafluorobutane at a temperature between about 25° C. and about 175° C. to produce 4,4-dichlorohexafluorobutene-1 as the product of the process.

15. The novel process of claim 14 in which said trialkyl phosphite is triethyl phosphite.

16. A novel process for producing a perfluorochlorooctene which comprises reacting the perfluorochlorooctane obtained by telomerizing trifluorochloroethylene in the presence of sulfuryl chloride, with trialkyl phosphite at a temperature between about 25° C. and about 175° C. to produce a perfluorochlorooctene, and recovering said perfluorochlorooctene as the product of the process.

17. A tetrachloroperfluorooctene having a $CF_2=CF-$ terminal group.

18. A novel process for producing a perfluorochlorodecene which comprises reacting the perfluorochlorodecane obtained by telomerizing trifluorochloroethylene in the presence of sulfuryl chloride, with a trialkyl phosphite at a temperature between about 25° C. and about 175° C. to produce a perfluorochlorodecene, and recovering said perfluorochlorodecene as the product of the process.

19. A pentachloroperfluorodecene having a terminal $CF_2=CF-$ group.

20. A novel process for the production of trifluorochloroethylene which comprises reacting 1,1,2-trichlorotrifluoroethane with a trialkyl phosphite at a temperature between about 25° C. and about 175° C. to produce trifluorochloroethylene, and recovering trifluorochloroethylene as the product of the process.

No references cited.